United States Patent
Gu et al.

(10) Patent No.: US 6,992,692 B2
(45) Date of Patent: Jan. 31, 2006

(54) SYSTEM AND METHOD FOR PROVIDING VIDEO QUALITY IMPROVEMENT

(75) Inventors: Qunshan Gu, Londonderry, NH (US); Juan Rojas, San Josse, CA (US); Narashima Rao, So. Grafton, MA (US)

(73) Assignee: Polycom, Inc., Pleasanton, CA (US)

( * ) Notice: Subject to any disclaimer, the term of this patent is extended or adjusted under 35 U.S.C. 154(b) by 420 days.

(21) Appl. No.: 10/449,851

(22) Filed: May 30, 2003

(65) Prior Publication Data

US 2004/0075772 A1  Apr. 22, 2004

Related U.S. Application Data

(60) Provisional application No. 60/384,606, filed on May 31, 2002.

(51) Int. Cl.
H04N 7/14 (2006.01)

(52) U.S. Cl. .................. 348/14.12; 348/14.08
(58) Field of Classification Search .. 348/14.01–14.16; 379/93.08, 93.17, 93.21
See application file for complete search history.

(56) References Cited

U.S. PATENT DOCUMENTS 6,438,275 B1 * 8/2002 Martins et al. ............. 382/300
6,700,601 B1 * 3/2004 Callaci .................... 348/14.12

* cited by examiner

*Primary Examiner*—Wing Chan
(74) *Attorney, Agent, or Firm*—Wong, Cabello, Lutsch, Rutherford & Brucculeri, LLP

(57) ABSTRACT

A system and method for providing video quality improvement are afforded. A video stream is monitored. A quality of at least one data field associated with the video stream is determined. A command is generated in response to the determined quality of the at least one data field. A video frame is then displayed according to the command.

40 Claims, 8 Drawing Sheets

SYSTEM AND METHOD FOR PROVIDING VIDEO QUALITY IMPROVEMENT

CROSS-REFERENCES TO RELATED APPLICATION

This application claims the benefit under 35 U.S.C. § 119(e) of U.S. Provisional Patent Application No. 60/384,606, filed May 31, 2002, which is incorporated herein by reference.

BACKGROUND OF THE INVENTION

1. Field of the Invention

The present invention relates generally to videoconference systems, and more particularly to providing video quality improvement.

2. Description of Related Art

The well-known National Television Standards Committee (NTSC) and Phase Alternating Line (PAL) television standards are employed by video cameras and monitors to capture and display video information for consumer applications. Both NTSC and PAL cameras and monitors capture and display video information in an interlaced format. Interlacing refers to a method of capturing two fields of video information per frame. One half of a vertical resolution of a frame (i.e., every other horizontal line) is captured in a first or "top" field. A remaining half of the vertical resolution of the frame is captured in a second or "bottom" field. Each frame of a video picture produced by the NTSC camera or displayed by the NTSC monitor is displayed in a 525-line format with each line having 720 pixels, while the PAL format is displayed in 625 lines. The NTSC video is transmitted at 60 frames per second, and the PAL video is transmitted at 50 frames per second. Adaptations of these formats have been adopted for emerging high-definition television as well.

Typically, the NTSC or PAL cameras and monitors are used in conjunction with video conferencing systems that implement the International Telecommunications Union (ITU) Telecommunications (ITU-T) H.263 standard (incorporated herein by reference in its entirety, including all annexes, appendices, and subparts thereof), since such devices are much less expensive than equipment that captures video information using progressive (non-interlaced) scan technology. Until recently, however, the H.263 standard did not directly support interlaced video transmission. The most common format used under H.263 before recent changes was the Common Intermediate Format (CIF), which is a non-interlaced frame consisting of 288 lines of 352 pixels each. Transmission rate for CIF video can be as high as 30 frames per second. Thus, videoconference systems had to convert from NTSC (or PAL) into CIF before coding each input video frame. Such a conversion discards some spatial and temporal information, and thus degrades the picture quality. In this context the "spatial information" is the pixels in both a vertical and a horizontal directions that are not included in the CIF frame. Likewise, the discarded "temporal information" represents the fact that a 60 or 50 frame per second (fps) transmission of the NTSC or PAL standard is down-sampled to 30 fps in the CIF format.

In recent years, cost of hardware and transmission bandwidth required for coding and transmitting interlaced video pictures has decreased. It is now considered economically practical for a video conferencing system to code interlaced pictures with a full spatial dimension of NTSC or PAL input sources. The ITU has addressed this change in technology by adding Annex W to the H.263 standard.

Annex W describes how interlaced video signals can be encoded and decoded when transmitted in a single stream (or channel) of video information. The Annex W video encoding (or simply "coding") scheme utilizes a reference frame from one field to predict a picture of another field. However, a top field in an interlaced video transmission scheme is a poor predictor of a bottom field and vice versa. Thus, using the top field to predict the bottom field can lead to poor picture quality during times of low motion.

This particular form of picture quality degradation is due to the fact that the camera creates a complete picture frame by first scanning for top field information and then scanning for bottom field information. Each field is thus separated spatially (by one line) and temporally (by the refresh period between the end of the top field and the end of the bottom field). This temporal and spatial separation can result in display jitter, which is more noticeable during times of low motion. With this problem in mind, Section W.6.3.11 of Annex W suggests that Annexes N or U of H.263 can be used to predict from more than one previous field. For example, two or three previous fields can be used to form a prediction of the next field. In particular, the field (or fields) to be used for prediction can be chosen (according to Annexes N or U) such that each top field is always predicted from the previous top field (or fields) and each bottom field is always predicted from the previous bottom field (or fields). In this way, the top field can be coded and transmitted in a stream completely separate from the stream containing the bottom field. Using the video information from the same field for prediction thus mitigates the picture quality problem described above.

This field prediction scheme is also more resilient to errors. If one stream of video information is temporarily dropped, the other stream can continue. Since one field remains, there is always some video information to decode and display, albeit at a slower update rate.

Further, more than one processor may be used to more efficiently encode a video stream in a multiple-processor architecture. For example, one processor can code the stream of top fields, and a second processor can code the stream of bottom fields; each processor is programmed to capture and encode either the top or bottom field of video information. Additionally, each processor may receive both streams of top or bottom fields and decode one. Conversely, the video conferencing system may be configured such that each processor only receives one of the field streams.

Several shortcomings exist in the above-described systems. Firstly, dropped fields caused by large amounts of motion or by transmission errors occurring in anyone of the video signal transmission streams can affect the quality of the displayed picture for an extended period of time. In such cases, the picture quality remains poor until the coding process recovers. For instance, if a field of information is lost during transmission for any reason, and a decoder signals an encoder to encode an "Intra" field (the use of Intra fields being described within the H.263 standard), the quality of that half of the picture (i.e., the lost field) will suffer for a period of time that it takes the encoder to recover from the error and/or encode the Intra frame.

Another shortcoming of prior art systems is that the field that the encoder begins encoding with (at start up) is indeterminate. The receiving videoconference system does not know a priori whether the first frame to be received will begin with a top field or a bottom field. This is so because, at the transmitting video conferencing terminal, the video camera starts generating and sending fields of video information before the encoder is ready to receive the information. After the encoder is itself initialized, the encoder begins processing at the beginning of the next field it sees.

This situation can cause additional and unacceptable transmission delay. If the received video stream begins with the same field that the encoder was initialized to expect, there are no problems and no added delay in subsequent encoding. If, however, the encoder receives the opposite field than the one that is expected, the encoder will wait (i.e., delay) for as much as an entire field capture time (e.g., 16.7 milliseconds) in order to receive and store the expected field. This image delay will prevail for the entire video conferencing session. Such a systematic delay can lead to unacceptable meeting dynamics and misunderstood conversations.

Therefore, there is a need for a video conferencing encoding and decoding method for interlaced video that immunizes against quality degradation in video signals and avoids introduction of additional delay.

SUMMARY OF THE INVENTION

The present invention provides in various embodiments a system and method for providing video quality improvement. A video stream is monitored, and a quality of at least one data field associated with the video stream is determined. Subsequently, a command is generated in response to the determined quality of the at least one data field. Then, a video frame is displayed according to the command.

According to one embodiment of the present invention, the system provides video quality improvement. A video stream is provided, including at least one data field. Further, a transmission device is configured to monitor the at least one data field, as well as to determine a quality of the at least one data field and generate a command in response to the determined quality. Subsequently, a receiving device is configured to receive the command, and executes the command. Finally, a display device displays a video frame according to the executed command.

According to another embodiment of the present invention, a method is provided for video quality improvement. Initially, a video stream is monitored; the video stream including at least one first data field. A quality value is then assigned to the at least one first data field and to at least one second data field. Next, the quality values of the at least one first data field and the at least one second data field are compared. Current video frame data is displayed if the quality values match, while previous video frame data is displayed if the quality values do not match.

A further understanding of the nature and advantages of the inventions herein may be realized by reference to the remaining portions of the specification and the attached drawings.

BRIEF DESCRIPTION OF THE DRAWINGS

The foregoing and other advantages of the invention will be appreciated more fully from the following further description thereof and with reference to the accompanying drawings, wherein.

DESCRIPTION OF EXEMPLARY EMBODIMENT

Introduction

To provide an overall understanding of the present invention, certain illustrative embodiments will now be described in the context of an ITU Standard H.263 video conferencing system. It will be understood by those of ordinary skill in the art that the methods and systems described herein may be suitably adapted to other video coding techniques, such as Moving Picture Experts Group (MPEG) standards, Audio Visual Interleave (AVI), or Multiple Image Network Graphics (MNG). All such adaptations and modifications that would be clear to one of ordinary skill in the art are intended to fall within the scope of the invention described herein.

Furthermore, although the term "coding" is used herein, those of ordinary skill in the art will appreciate that the reciprocal decoding function is also implicated in the use of the present invention. Accordingly, all references to coding techniques are to be understood to include decoding techniques unless specifically identified otherwise.

As used herein, terms such as "image", "image data", "picture", "picture data", "video", "video data", and "video stream" are intended to refer generally to any form of video data, unless specifically stated otherwise. This includes reference images (which may, for example, be represented or described in terms of luminance and chrominance data), differential data, motion vectors, sequential identifiers, and any other coding and control information, whether relating to blocks, macro-blocks, frames, or any other partial or complete image representation, however encoded.

Disclosed herein is a system for interlaced video encoding and decoding in a video conferencing system that improves video picture quality and decreases potential end-to-end delay in a video conferencing context. Video picture quality is improved by using a combination of field-based predictive coding and dynamic quality measurement to limit transmission of coded fields to only those fields meeting a minimum quality standard. In particular, a display "freeze" functionality described in Annex L of the ITU-T H.263 standard is used to continue to encode a lower quality field until a relative field-to-field quality recovers. Freezing only the lower quality field in this manner permits encoding, transmission, and subsequent decoding and display of a higher quality field, thus providing higher quality video at half a field rate. The lower quality field remains frozen until the field quality recovers. As the quality measurement is made on every field, recovery time is minimized.

Figure 1:
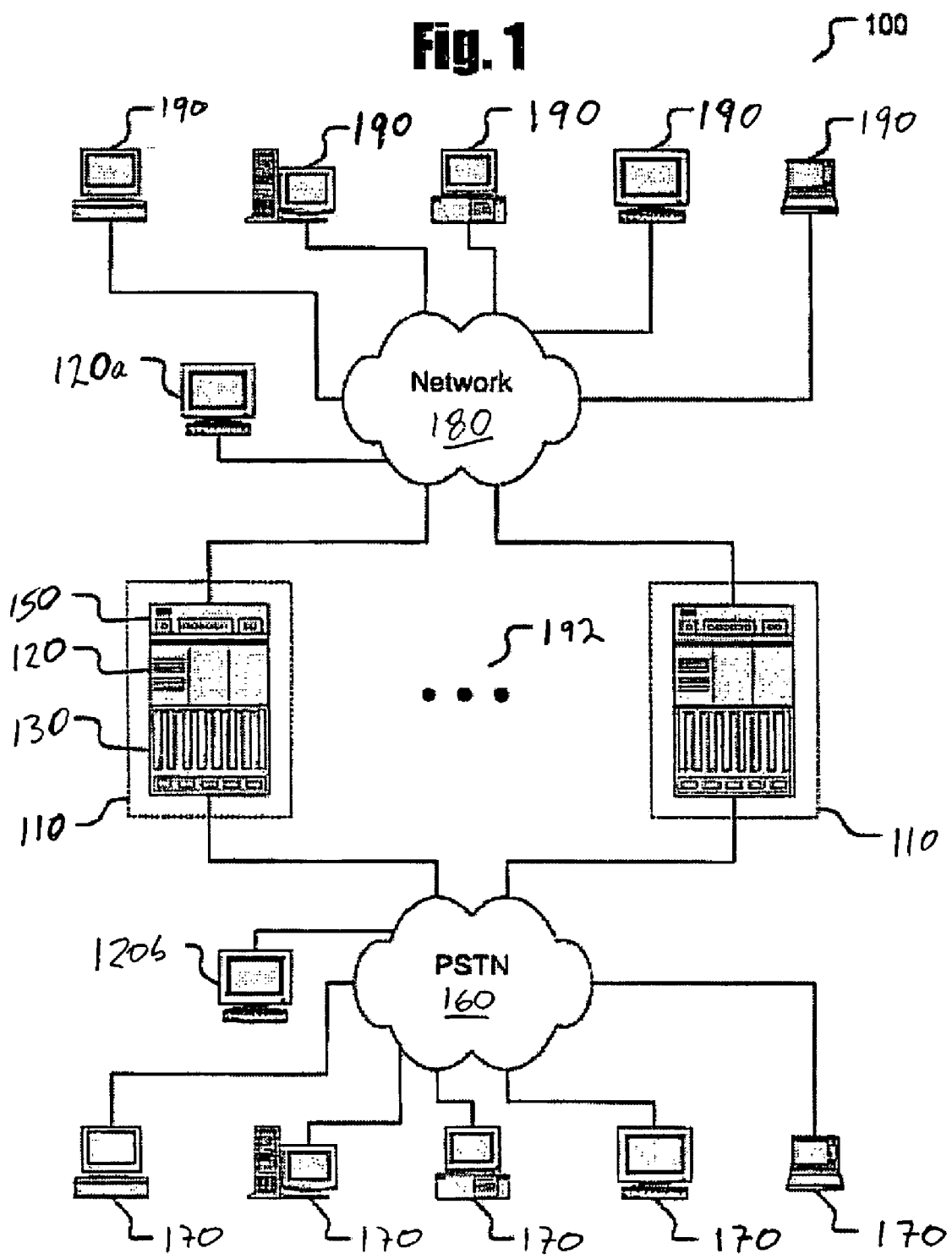
FIG. 1 is a block diagram of an exemplary video conferencing system that may be used with the present invention.

Referring now to FIG. 1, an exemplary video conferencing system that may be used with the present invention is shown. In a video conferencing network 100, a rack 110 may include a multi-point conference unit ("MCU") 120, a gateway 130, and hardware/software for other services 150. The gateway 130 may provide one or more connections to a Public Switched Telephone Network 160, for example, through high speed connections such as Integrated Services Digital Network ("ISDN") lines, T1 lines, or Digital Subscriber Lines ("DSL"). Multiple PSTN video conferencing terminals 170 may also be connected in a communicating relationship with PSTN 160, and may be accessible using known telecommunications dialing and signaling services.

The MCU 120 may also be connected in a communicating relationship with a network 180. Multiple Internet Protocol ("IP") video conferencing terminals 190 may also be connected in a communicating relationship with the network 180, and may be accessible using known data networking techniques, such as IP addressing.

It will be appreciated that, although the following description refers to the network 180 (e.g., an IP network such as the Internet) and the PSTN 160, any network for connecting terminals may be usefully employed according to the principles of the invention. The network 180, for example, may be any packet-switched network, a circuit-switched network (such as an Asynchronous Transfer Mode ("ATM") network), or any other network for carrying data including the Internet. The network 180 may also be the Internet, an extranet, a local area network, or other networks. The PSTN 160 may, likewise, be any circuit-switched network, or any other network for carrying circuit-switched signals or other data. It will additionally be appreciated that the PSTN 160 and/or the network 180 may likewise include wireless portions, or may be completely wireless networks. It will also be appreciated that the principles of the present invention may be usefully employed in any multimedia system.

Further, the components of the rack 110, such as the MCU 120, the gateway 130, and the other services 150, may be realized as separate physical machines, as separate logical machines on a single physical device, as separate processes on a single logical machine, or some combination of these. Further, a single, physical rack device is not required. Additionally, each component of the rack 110, such as the gateway 130, may comprise a number of separate physical machines grouped as a single logical machine, as for example, where traffic through the gateway 130 exceeds the data handling and processing power of a single machine. Further, a distributed video conferencing network may include a number of racks 110, as indicated by an ellipsis 192.

Each PSTN video conferencing terminal 170 may use an established telecommunications video conferencing standard such as H.320. Further, each IP video conferencing terminal 190 may use an established data networking video conferencing standard such as H.323. H.320 is the ITU-T standard for sending voice and audio over the PSTN 160, and provides common formats for compatible audio/video inputs and outputs, and protocols that allow a multimedia terminal to utilize the communications links and synchronize audio and video signals. The T. 120 standard may also be used to enable data sharing and collaboration. The ITU-T, H.320, and T. 120 standards are incorporated herein by reference.

The gateway 130 may communicate with the PSTN 160, and may translate data and other media between a form that is compatible with the PSTN 160 and a form that is compatible with the network 180, including any protocol and media translations required to transport media between the networks.

Figure 2:
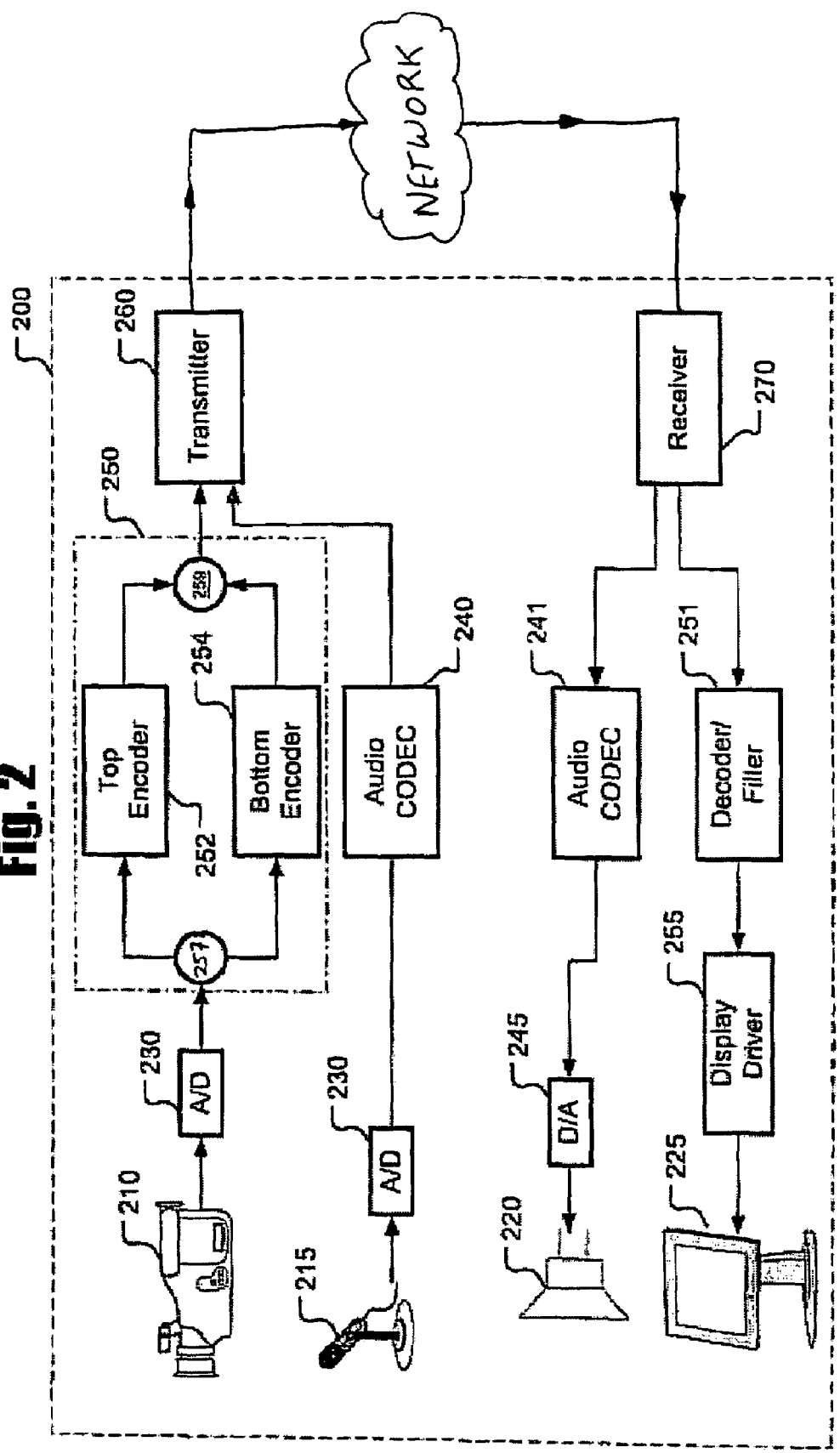
FIG. 2 is a high-level schematic view of elements of a videoconference terminal.

Referring now to FIG. 2, some major components in a high-level schematic form of a video conferencing terminal suitable for use with either a PSTN or an IP network are shown. A terminal 200 may include input devices such as a video camera 210, a microphone 215, and various other input devices such as a keyboard and a mouse (not shown). The terminal 200 may also include output devices such as a speaker 220 and a display system 225. Those of ordinary skill in the conferencing arts will also recognize that additional input and output devices, including but not limited to overhead projectors, projection video systems, and whiteboards, may also be used as components within the video conferencing terminal 200.

The video conferencing terminal 200 also may contain analog to digital converters ("A/D") 230 for converting analog input signals from one or more sources into a digital form for encoding. An audio coder/decoder ("codec") 240, which may include A/D 230 functionality, encodes audio signals for transmission via a transmitter 260. Similarly, a video codec 250 performs analogous functions for video signals.

In an exemplary embodiment, the video codec 250 comprises separate encoders 252 and 254 for top and bottom video fields that make up each video frame. The video codec 250 may also include field splitter 257 and combiner/multiplexer 259 functions and A/D function 230, depending on the type and output signal characteristics of the camera 210. Typically, functional blocks 230, 257, 252, 254, and 259 are present in all video encoding systems, and the present description is intended only to convey a functional overview of video signal processing rather than a working schematic.

While those of ordinary skill in the art will readily recognize the function of a codec, as used herein, the term "codec" is not limited to a device or subsystem that performs coding and decoding simultaneously. Instead, the term "codec" is here used to refer to aggregated functions of coding (or encoding) and decoding, which may be performed exclusively or in combination with one or more physical devices. Thus, in certain instances the term "encoder" (or its equivalent, "coder") is used to connote the encoding function only. In other instances, the term "decoder" is used to connote the decoding function. In still other contexts, the term "codec" may be used as a generalization of either or both functions.

The video codec 250 and the audio codec 240 (and their counterpart codecs 251 and 241 in the receiving path of the terminal 200) provide standards-based conferencing according to the H.320 and T. 120 standards for PSTN terminals or H.323 standard for IP terminals. These standards may be implemented entirely in software on a computer (not shown), on dedicated hardware, or in some combination of both.

The terminal 200 also includes a receive path, comprised of a network receiver 270, the audio codec 241, and the video codec 251. The video codec 251 may include a display driver function, or that function may be implemented separately in a display driver 255, as shown. Likewise, the audio codec 240 may include a digital to analog ("D/A") converter or the D/A function may be provided externally, as in the D/A converter 245.

Referring back to FIG. 1, the MCU 120 may communicate with the IP video conferencing terminals 190 over the network 180 or with the PSTN video conferencing terminals 170 over the PSTN 160. The MCU 120 may also include hardware and/or software implementing the H.323 standard (or the H.320 standard, where the MCU 120 is connected to the PSTN 160) and the T.120 standard, and may also include multipoint control for switching and multiplexing video, audio, and data streams in a multimedia conference, the MCU 120 may additionally include hardware and/or software to receive from, and transmit to, the PSTN video conferencing terminals 170 connected to the gateway 130.

The MCU 120 may reside on one of the racks 110 (as shown in FIG. 1) or may be located elsewhere in the network, as are the MCUs 120a and 120b. It will be appreciated that the MCU 120 may also reside in one of the PSTN video conferencing terminals 170, or one of the IP video conferencing terminals 190, and may be implemented in hardware, software, or some combination thereof.

The rack 110 may provide additional services 140 for use in a video conferencing network. These may include, for example, audio/video codecs that are not within the H.323 or H.320 standards, such as the G2 codec and streamer for use with a proprietary streaming system sold by RealNetworks, Inc. or a Windows Media codec for use with proprietary media systems sold by Microsoft Corporation. Other services may include, for example, a directory server, a conference scheduler, a database server, an authentication server, and a billing/metering system.

Video codecs may include codecs for standards such as H.261 FCIF, H.263 QCIF, H.263 FCIF, H.261 QCIF, and H.263 SQCIF. These are video teleconferencing standards that define different image size and quality parameters. Audio codecs may include codecs for standards such as G.711, G.722, G.722.1, and G.723.1. These teleconferencing standards define audio data parameters for audio transmission. Any other proprietary or non-proprietary standards currently known or that may be developed in the future for audio, video, and data may likewise be used with the present invention, and are intended to be encompassed by this description. For example, current H.320 devices typically employ monaural sound; however, the principles of the invention may be readily adapted to a conferencing system employing stereo coding and reproduction, or any other spatial sound representation. Each and every standard recited is hereby incorporated by reference in its entirety, including any and all appendices, annexes, and subparts thereof, as if it were set forth herein.

Immunizing Against Quality Degradation

In one embodiment of the present invention, picture layer information in a H.263 compliant video stream has certain information and commands (defined in Annex L to the H.263 standard) encoded within by an encoding codec (or "encoder") at a transmitting VC terminal. These commands, referred to as "functions" in the H.263 standard, allow the encoder to control the decoding far-side codec (or decoder) by embedding signals and information in a picture layer. Also included in the picture layer information are various data fields that can provide an approximate measure of picture quality, including (but not limited to) a PQUANT field. The field quality measure is referred to generally as "Q" throughout this document.

In the event that the quality of the video stream being transmitted is poor, as measured by Q, the encoding codec may generate (and transmit to the decoder) a function that causes the decoder to freeze (i.e., not display) the poor quality video information. Alternatively, if the transmit video buffer overflows for any reason and the transmitted video stream degrades in quality, it is likewise possible to use the "freeze" function capability described in Annex L to mitigate the problem. In particular, signaling the decoding codec to perform a "freeze" causes the contents of the frame associated with the freeze request to not be displayed, even though some video information (such as the header) may still be transmitted.

Encoder (near-end codec) to decoder (far-end codec) signaling may be implemented, in some embodiments of the present invention, in accordance with Section W.6.3.11 of Annex W to the H.263 standard.

Figure 4:
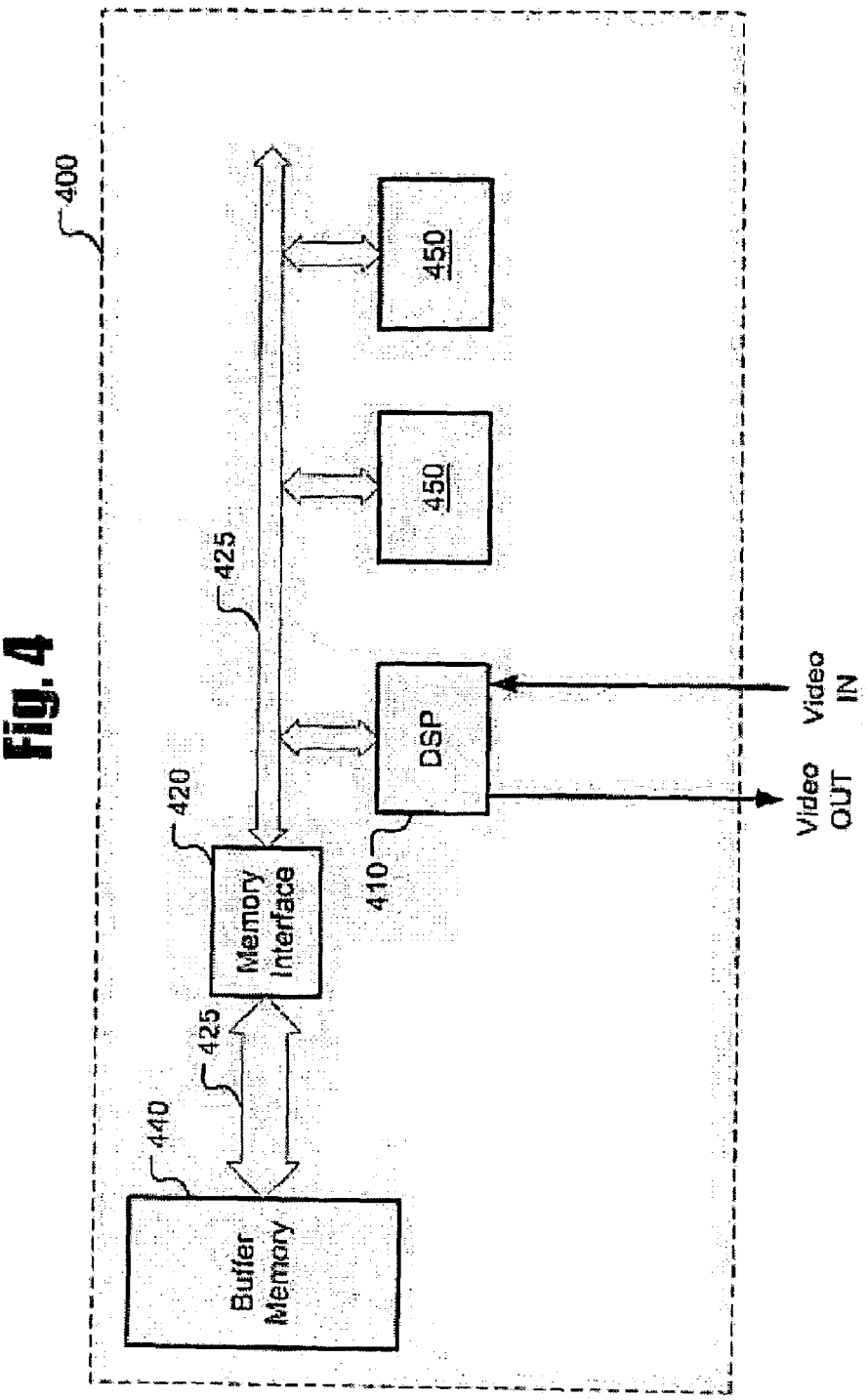
FIG. 4 is a high-level schematic view of a video processor, according to one embodiment of the present invention.

In the exemplary embodiment of FIG. 2, the camera 210 captures two fields of video information. This video information is subsequently digitized in the A/D 230, and encoded in the encoding codec 250 (which may consist of the separate encoder-processors 252 and 254). A single, representative processor will be discussed in more detail in connection with FIG. 4. Although FIG. 4 is described in reference to the encoder-processors 252 and 254, those skilled in the art will realize that processors for decoding typically employ symmetrical decoding processes, and that any coding performed by an encoder-processor must be decoded by the decoder-processor.

Referring back to the functional block diagram of FIG. 2, the buffered video data may be transmitted by the transmitter 260 to a remote video conferencing terminal similar, if not identical in functionality, to the terminal 200. At the receiving end, a receiver 270 may receive the video stream, passing the video signal to a receiving decoder. (As in the encoding side of video conferencing terminal 200, the receiving video decoder may consist, in some embodiments, of two or more processors.). The receiving decoder may include a filter to generate the video information to be displayed in place of the field data suppressed as a result of the freeze message. The process whereby the decoder filter generates the replacement data is explained further below.

Figure 3:
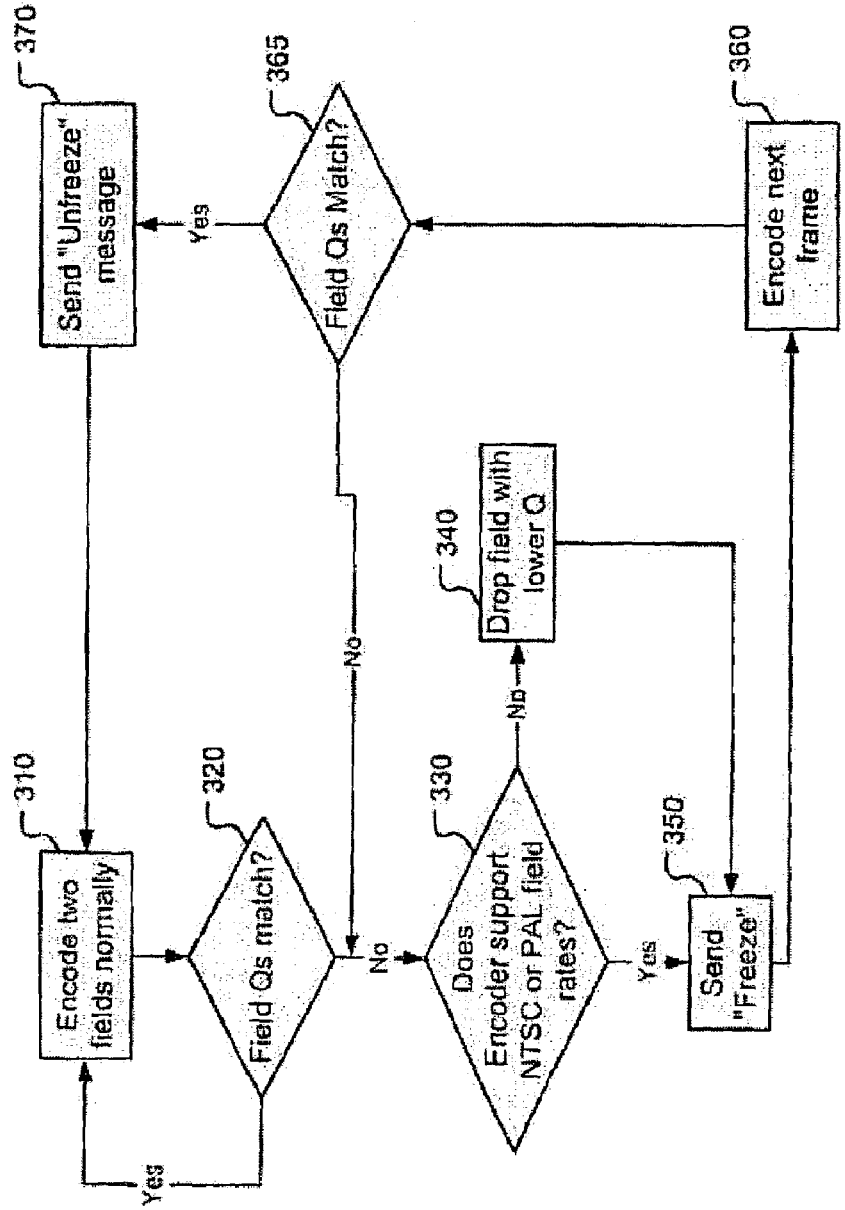
FIG. 3 is a flowchart of an exemplary encoding process.

Referring now to FIG. 3, a flowchart 300 illustrating an exemplary encoding process of the present system is shown. As a result of either a decoding codec requesting otherwise-normal encoding in step 310 of an intra field, or as a result of high motion in the video frame, the Q values of two fields (F1 and F2) of video information may not match. In step 320, a comparison of the most-recently encoded field's Q and the previous field's Q is performed. If the two fields do not match within a predefined tolerance (which may be, for example, set by the operator based on an operator's visual perception of video quality), control passes to step 330. If, however, the Qs match, normal encoding of a next field proceeds in step 310.

At step 330, the encoding codec checks to see if the system can support a PAL transmission rate of 50 fields per second and or a NTSC transmission rate of 60 fields per second. If the system cannot support either rate (e.g., if the system is operating at less that the typical PAL/NTSC rates), the field having the lower Q is dropped in step 340 before sending a freeze message to the decoder in step 350. Typically, field drop is employed in slower speed systems to conserve transmission bandwidth and avoid delay. Although the "Annex L" freeze mechanism can be utilized, as discussed herein, any suitable freeze message and/or mechanism for communicating the freeze message may be employed that is suitable for use with the present invention. Otherwise, for systems operating at either the PAL or NTSC rates, the freeze message is sent without dropping a field in step 350.

The freeze message may be a "Full Picture Freeze Request" as described in Section L.4 of Annex L. This request causes the entire prior displayed video frame to be kept unchanged. Thus, in order to display only a higher Q field (i.e., the better quality field in the frame), an "unfreeze" message must be sent with every high-Q field so that the system alternately freezes and unfreezes the display. In this way, the high-Q fields continue to update the display, providing continuous video, albeit at one half of the usual field rate.

At this point in the flowchart 300, the next frame (i.e., both the top and the bottom field) may be received and each field encoded in step 360. If the Qs of the two fields match in step 365, then the encoder sends an "unfreeze" message in step 370 to restore the decoder to its nominal processing mode. Otherwise, the process returns to step 330.

Referring now to FIG. 4, a high-level schematic view of a video processor 400 is shown. A core of processor 400 may include a digital signal processor (DSP) 410. Configured and controlled by software-based and firmware-based methods, the DSP 410 receives the digital video data input, and formats it for transmission according to the H.263 standard. The DSP 410 may also make use of a memory interface 420, data busses 425, and a local video buffer memory 440 to temporarily store (i.e., buffer) video field and frame data while processing. Further, the data busses 425 may also connect other peripheral devices 450, such as a Peripheral Component Interconnect (PCI) interface or D/A or A/D converters, to perform high-level functions as depicted in FIG. 2.

Figure 5:
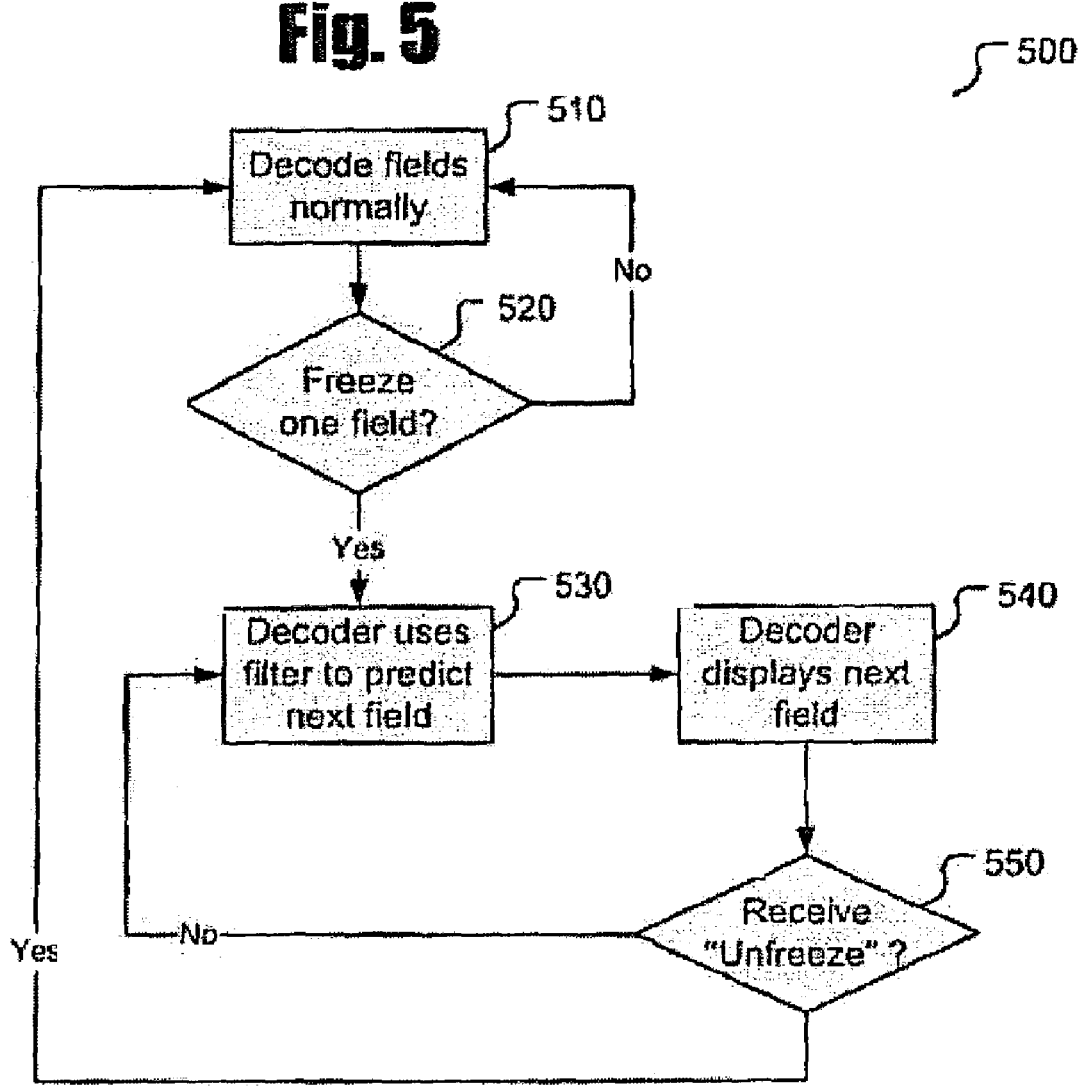
FIG. 5 is a flowchart of an exemplary decoding process.

Referring now to FIG. 5, a flowchart 500 of an exemplary process employed in a decoder portion of the system is shown. Normally, incoming fields are decoded in step 510. When the decoder receives a freeze field signal (as tested by step 520), the decoder may employ a filter to predict (or estimate) what the frozen field should be in step 530 in order to display two full fields of information for the frame. This filter may be, for example, a five-tap phase shifting filter, but more or less than five taps may also be used.

The predicted field is constructed pixel by pixel using two corresponding pixels in two lines immediately above and three lines immediately below the pixel to be estimated. The processor then stores the predicted pixel in the display buffer for eventual display. The estimation may be conducted on a line-by-line basis in the same field, or the estimation may be conducted using one or more prior fields.

Each predicted pixel may be calculated according to the equation:

$$\text{Pixelpred} = A_1 P_1 + A_2 P_2 + A_3 P_3 + \ldots + A_n P_n$$

where each $A_n$ is a filter coefficient and each P is a chroma and luminance vector for each corresponding pixel in adjacent lines 1 though n. The filter coefficients may be tuned by an operator based on the operator's subjective perception of display quality. Accordingly, the present system is not limited to any particular set of filter coefficients. Further, those skilled in the art will realize that various values may be used for the filter tap value, n. Accordingly, the invention is not limited to any particular number of filter taps.

The decoder continues to predict pixels and display the predicted field until the decoder receives an unfreeze message in step 550 sent by the encoder. If the unfreeze message is received, the method resumes decoding fields normally at step 510. However, if the unfreeze message is not received, the method returns to step 530 to predict a next field.

Delay Avoidance

At video conferencing system startup, both the video encoder and video decoder are initialized to receive either a top field or a bottom field of video frame data. As part of this initialization, a display buffer pointer is set to a particular memory location at each video conferencing terminal corresponding to the first line of a field of video information. A second display buffer and its associated pointer are maintained by a local processor for the bottom field. Alternatively, a second, separate processor may be employed to buffer alternating fields.

As field information is received by a video conferencing terminal (either from a local camera or from a transmitting terminal), the data may be temporarily stored (buffered) in a local display buffer by the terminal's video processor. During normal operations, the display buffer pointer is changed by the processor during a vertical blanking period of each frame to reset the pointer to the beginning of the buffer in preparation for the next field. For example, if a first field received is a top field, the display buffer should be reset to the beginning of the bottom field buffer after the top field has been displayed.

Regardless of the initial state of the display buffer pointer, if the first line of a new field arriving after initialization (the "initial field") does not match the field state of the buffer pointer, the video processor senses a state mismatch, and dynamically resets the buffer pointer to point to the correct buffer. Where, as in PAL or NTSC video, the buffer pointer has only two possible states (i.e., pointing to the top field or the bottom field), this "dynamic reset" can take the form of a state toggle.

The video processor senses the received field state when it decodes the video information and the picture layer information. In particular, a PSUPP field in the picture layer of an H.263-complaint video signal contains, within a picture message (function type [FTYPE] 14), an indication of whether the field is a top or a bottom field. The PSUPP field is itself fully described in section W.63 of Annex W to the H.263 standard.

Figure 6:
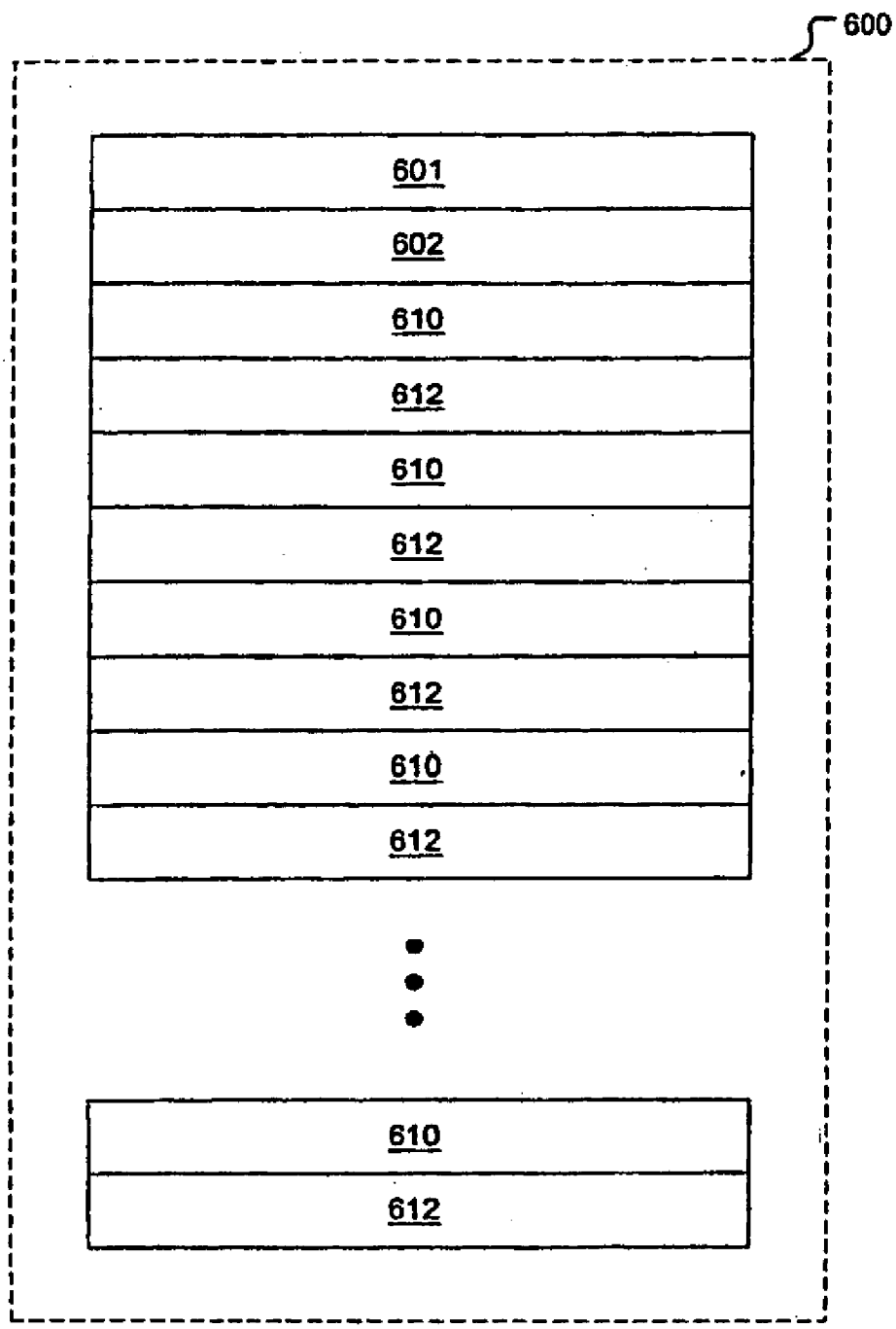
FIG. 6 is an exemplary schematic representation of an organization of a video frame buffer.

Referring now to FIG. 6, a depiction of a video buffer memory space 600 in schematic form is shown. Region 601 is allocated for storing the first line of the top field; region 602 is allocated for the first line of the bottom field. Subsequent regions 610 and 612 store additional lines of the top and bottom fields, respectively. Since the buffer pointers are set to point to either the first line of the top field (region 601) or the bottom field (region 602), a state change or toggle can be affected by resetting the pointer from region 601 to region 602 or vice versa.

As each field is decoded (or frozen, as the case may be), the field is displayed on the monitor 225 (FIG. 2) at a remote, receiving video conferencing terminal. The display process may be accomplished through any of the well known means in the art, as described in the standards recited above and incorporated herein by reference.

Figure 7:
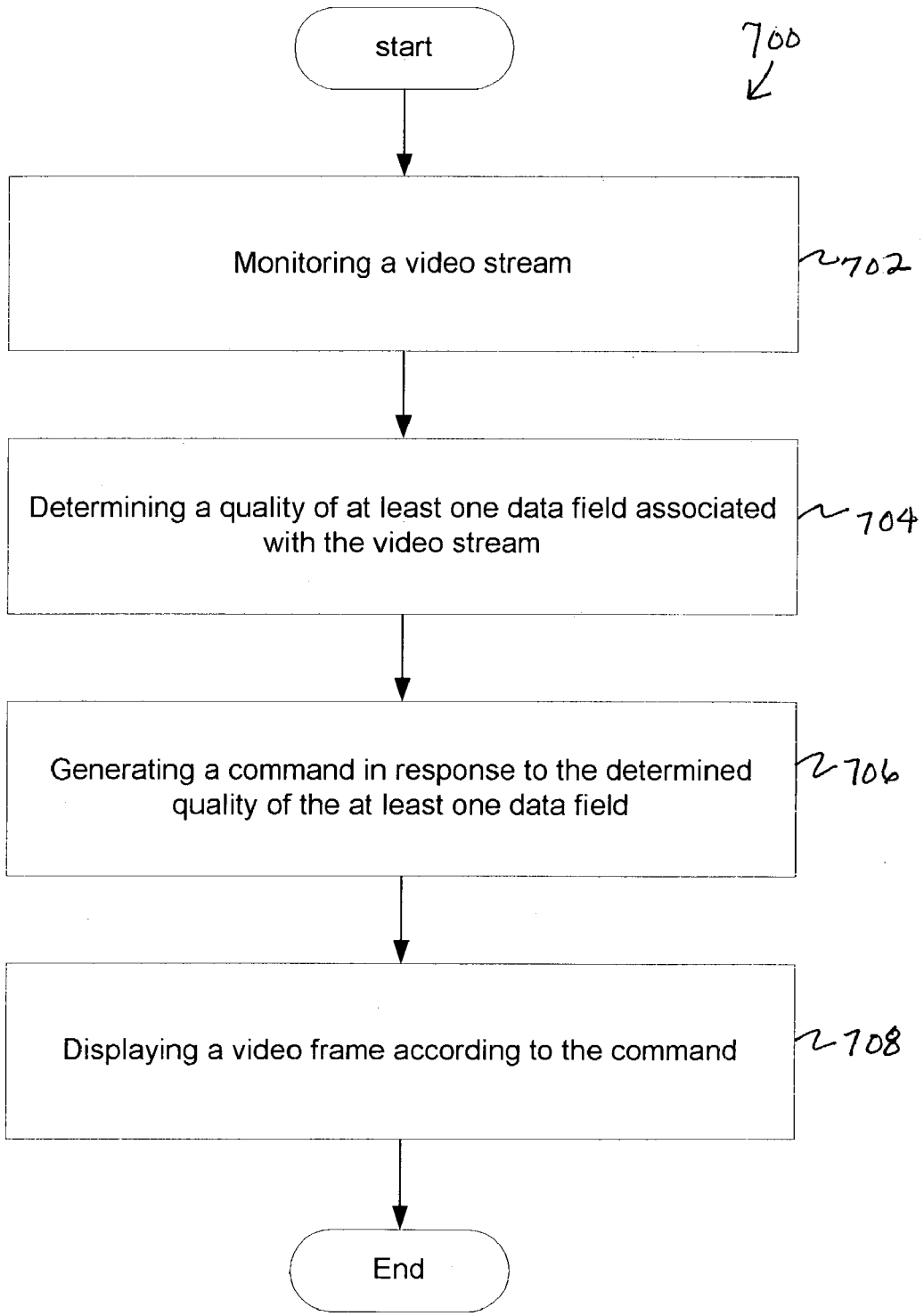
FIG. 7 is a flowchart illustrating a process for providing video quality improvement.

Referring now to FIG. 7, a flowchart 700 illustrating a process for providing video quality improvement is shown. At step 702, a video stream is monitored. The video stream may include H.263 compliant video streams, for example. Subsequently in step 704, a quality of at least one data field associated with the video stream is determined. A command is generated in response to the determined quality of the at least one data field in step 706. The command may be signaled to a video decoder. Further, the command may be generated by a video encoder or the video decoder. A video frame is then displayed according to the command in step 708. Next, data for a subsequent video frame may be requested in response to the command.

As discussed herein, the command may be a freeze frame command that dictates that a previous video frame is displayed. Alternatively, the freeze frame command may dictate that a predicted video frame is displayed. The predicted video frame may be generated based on data estimated for the at least one data field according to data from at least one other data field. The data may be estimated by predicting pixel values for the at least one data field based upon pixel values of at least one other data field. Predicting pixel values may include calculating a weighted average for predetermined pixel locations of at least one other data field. Further, predicted pixel values may be based on calculating a weighted average for five or any other number of predetermined pixel locations of at least one other data field.

Figure 8:
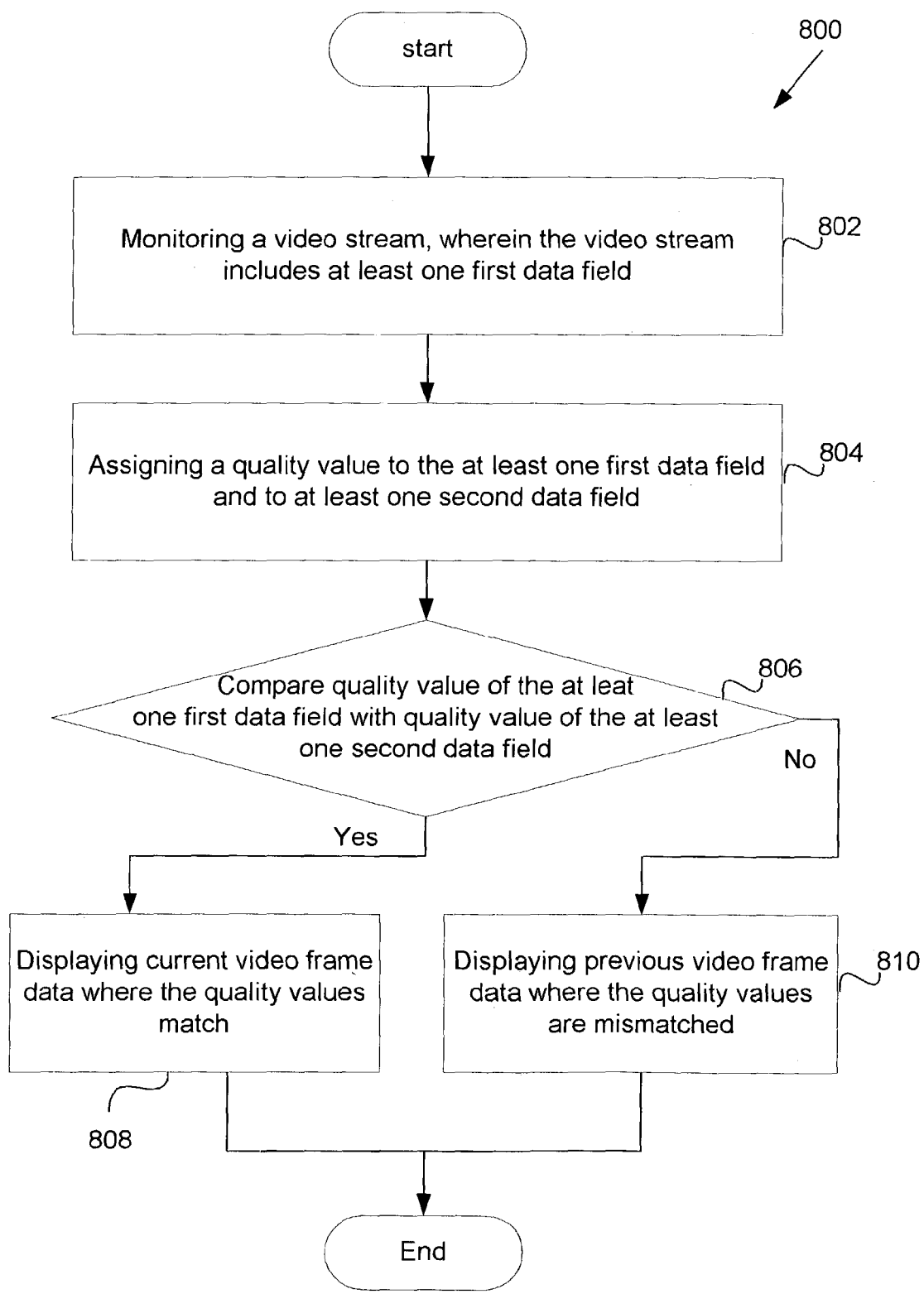
FIG. 8 is a flowchart illustrating an alternative process for providing video quality improvement.

Referring now to FIG. 8, a flowchart 800 illustrating an alternative method for providing video quality improvement is shown. At step 802, a video stream, including at least one first data field, is monitored. Next in step 804, a quality value is assigned to the at least one first data field and to at least one second data field. The quality value assigned to the at least one first data field is compared to the quality value assigned to the at least one second data field to determine a match in step 806. If the compared quality values match, a current video frame data is displayed in step 808. Alternatively, if the quality values do not match, then a previous video frame data is displayed in step 810.

A rate associated with the quality value of the at least one first data field and the at least one second data field is determined. Either the at least one first data field or the at least one second data field is dropped according to the rate.

Alternate Embodiments

As noted herein, a preferred measure of video quality, Q, transmitted in the picture layer by the encoder is PQUANT. However, PQUANT is not the only possible measure of video field quality. Other measures, such as a signal-to-noise ratio (SNR) of the field, a difference in chrominance or luminance (or both) between reference pixel groups in each field, an amount of motion from field to field (as represented by, e.g., a motion vector), a mean-square-error, and a field-to-field elapsed time (where greater elapsed time indicates lower quality empirically) may also be used. Accordingly, the present invention shall not be limited to a single measure of Q. Rather, any measure of field quality now known or later discovered shall fall within the scope of the present invention.

Further, the order in which the steps of the present method are performed is purely illustrative in nature. In fact, the steps can be performed in any order or in parallel, unless otherwise indicated herein.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within Web pages transferred among devices connected to the Internet. Accordingly, the present invention is not limited to any particular platform, unless specifically stated otherwise herein.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of providing video quality improvement, comprising:
    monitoring a video stream;
    determining a quality of at least one data field associated with the video stream;
    generating a command in response to the determined quality of the at least one data field; and
    displaying a video frame according to the command.

2. The method of claim 1 further comprising:
    determining a quality of at least one second data field associated with the video stream;
    wherein the command is generated by comparing the quality of the at least one data field to the quality of the at least one second data field.

3. The method of claim 2 wherein the command dictates that the displayed video frame is a current video frame in response to a match in the determined quality of the at least one data field and the determined quality of the at least one second data field.

4. The method of claim 2 wherein the command dictates that the displayed video frame is a previous video frame in response to a mismatch in the determined quality of the at least one data field and the determined quality of the at least one second data field.

5. The method of claim 2 further comprising:
    determining a rate associated with the quality value of the at least one data field and the at least one second data field; and
    dropping one of the at least one data field and the at least one second data field in response to the rate.

6. The method of claim 1 wherein the quality is determined based on at least one parameter selected from the group consisting of: quantizer information, signal to noise ratio, chrominance difference, luminance difference, field-to-field motion, mean-square-error, and a field-to-field elapsed time.

7. A system for providing improvement in the quality of video displayed from a video stream comprising at least one data field, said system comprising:
    a transmission device configured to monitor the video stream, determine a quality of the at least one data field, and generate a command in response to the determined quality;
    a receiving device configured to receive and execute the command; and
    a display device configured to display a video frame according to the executed command.

8. The system of claim 7 wherein the transmission device is further configured to determine a quality of at least one second data field and wherein the command is generated by comparing the quality of the at least one data field to the quality of the at least one second data field.

9. The system of claim 8 wherein the command dictates that the displayed video frame is a current video frame in response to a match in the determined quality of the at least one data field and the determined quality of the at least one second data field.

10. The system of claim 8 wherein the command dictates that the displayed video frame is a previous video frame in response to a mismatch in the determined quality of the at least one data field and the determined quality of the at least one second data field.

11. The system of claim 8 wherein the transmission device further determines a rate associated with the quality value of the at least one data field and the at least one second data field and generates a command instructing the receiving device to drop one of the at least one data field and the at least one second data field in response to the rate.

12. The system of claim 7 wherein the quality is determined based on at least one parameter selected from the group consisting of: quantizer information, signal to noise ratio, chrominance difference, luminance difference, field-to-field motion, mean-square-error, and a field-to-field elapsed time.

13. A video conferencing terminal comprising:
at least one video input device generating a video signal comprising at least a first field and a second field; and
a video codec configured to encode the video signal;
wherein the video codec determines a quality of the first field and a quality of the second field and, if the quality of the first field does not match the quality of the second field, generates a command for the decoder not to display the lower quality field.

14. The video conferencing terminal of claim 13 wherein the video codec comprises a first encoder configured to encode the first field and a second encoder configured to encode the second field.

15. The video conferencing terminal of claim 13 wherein the command dictates that a non-displayed field is replaced by a previous field.

16. The video conferencing terminal of claim 13 wherein the command dictates that a non-displayed field is replaced by a predicted field.

17. The video conferencing terminal of claim 16 wherein the predicted field is generated based on data estimated from a displayed field.

18. The video conferencing terminal of claim 17 wherein the estimated data comprises a plurality of predicted pixel values each determined as a weighted average of predetermined pixel locations in the displayed field.

19. The video conferencing terminal of claim 18 wherein the weighted average is determined based on five predetermined pixel locations in the displayed field.

20. The video conferencing terminal of claim 13 wherein the quality is determined based on at least one parameter selected from the group consisting of: quantizer information, signal to noise ratio, chrominance difference, luminance difference, field-to-field motion, mean-square-error, and a field-to-field elapsed time.

21. A video conferencing terminal comprising:
a network receiver configured to receive video data corresponding to at least one of a first field and a second field of a video signal and at least one command generated by an encoder in response to a quality of the first field and a quality of the second field;
a video codec decoding the video signal for display;
wherein the video codec is configured to not display one of the first field and second field in response to the command.

22. The video conferencing terminal of claim 21 wherein the video codec comprises a first decoder configured to decode the first field and a second decoder configured to decode the second field.

23. The video conferencing terminal of claim 22 wherein the video codec further comprises a filter to generate video information to be displayed in place of a field not displayed.

24. The video conferencing terminal of claim 23 wherein the filter is a five-tap phase shifting filter.

25. The video conferencing terminal of claim 21 wherein the command dictates that a non-displayed field is replaced by a previous field.

26. The video conferencing terminal of claim 21 wherein the command dictates that a non-displayed field is replaced by a predicted field.

27. A method of improving the quality of a video signal including at least a first field and a second field comprising:
encoding the first field and determining a quality thereof;
encoding the second field and determining a quality thereof;
comparing the quality of the first field and the quality of the second field;
generating a command in response to the comparison; and
transmitting the command and at least one of the encoded first field and the encoded second field to a receiver.

28. The method of claim 27 wherein the command instructs the receiver not to display one of the first field or the second field.

29. The method of claim 28 wherein a non-displayed field is not transmitted.

30. The method of claim 29 wherein the command dictates that a non-displayed field is replaced by a previous field.

31. The method of claim 27 wherein the command dictates that a non-displayed field is replaced by a predicted field.

32. The method of claim 31 wherein the predicted field is generated based on data estimated from a displayed field.

33. The method of claim 32 wherein the estimated data comprises a plurality of predicted pixel values each determined as a weighted average of predetermined pixel locations in the displayed field.

34. The method of claim 33 wherein the weighted average is determined based on five predetermined pixel locations in the displayed field.

35. The method of claim 27 wherein the quality is determined based on at least one parameter selected from the group consisting of: quantizer information, signal to noise ratio, chrominance difference, luminance difference, field-to-field motion, mean-square-error, and a field-to-field elapsed time.

36. A method of improving the quality of a video signal including at least a first field and a second field comprising:
receiving video data comprising a command and at least one of an encoded first field and an encoded second field;
determining, in response to the command, whether to display each of the encoded first field and the encoded second field; and
decoding at least one of the encoded first field and encoded second field to be displayed.

37. The method of claim 36 further comprising:
generating an alternative field to be displayed in place of a non-displayed field.

38. The method of claim 37 wherein the alternative field is constructed from a displayed field.

39. The method of claim 37 wherein the alternative field is constructed from one or more prior fields.

40. The method of claim 36 wherein the quality is determined based on at least one parameter selected from the group consisting of: quantizer information, signal to noise ratio, chrominance difference, luminance difference, field-to-field motion, mean-square-error, and a field-to-field elapsed time.

* * * * *